Oct. 10, 1950     A. H. LAMB     2,525,361
FREE AIR THERMOMETER
Filed March 22, 1948
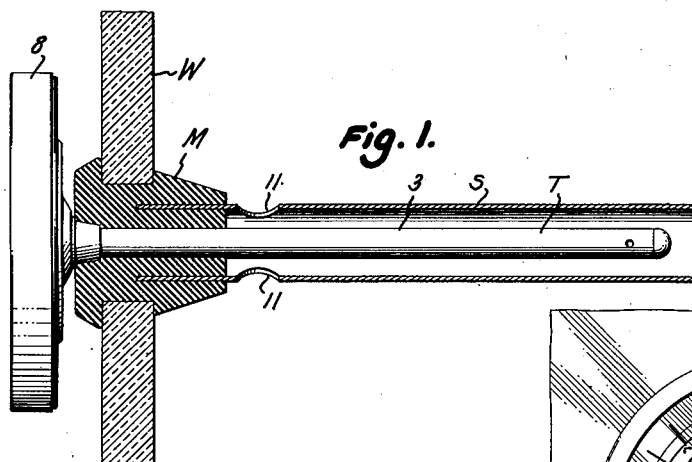
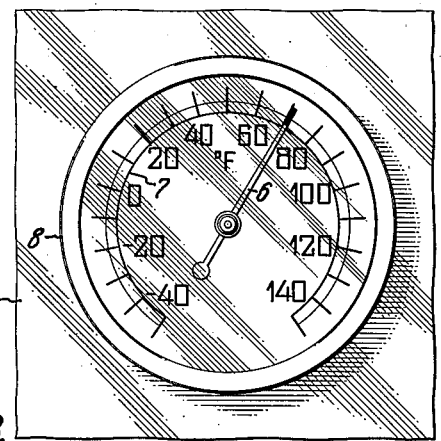
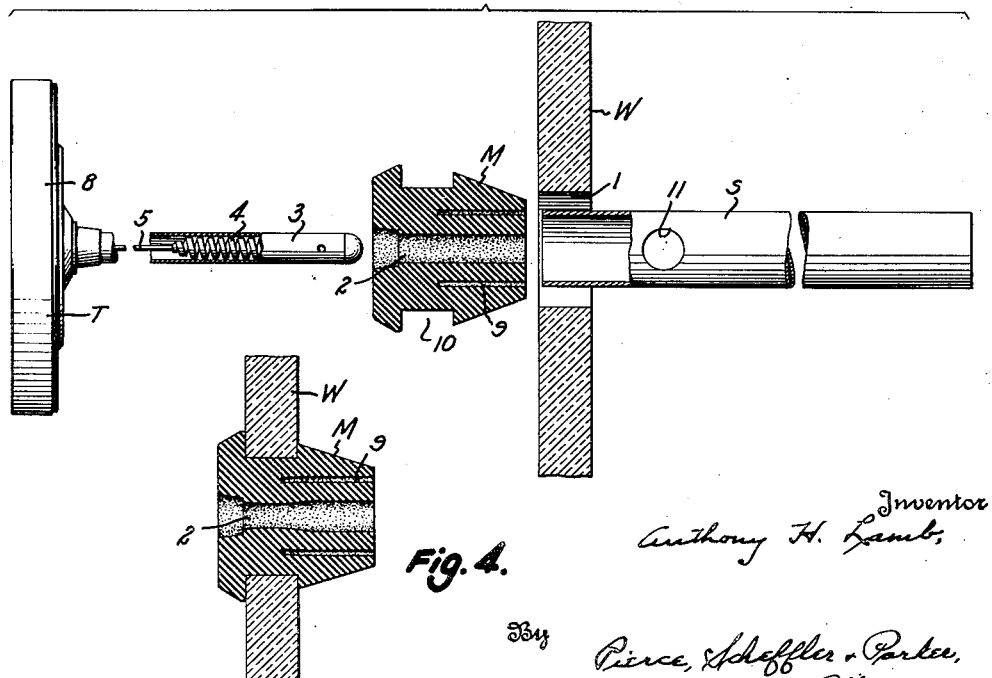
Inventor: Anthony H. Lamb,
By Pierce, Scheffler & Parker, Attorneys.

UNITED STATES PATENT OFFICE 2,525,361

FREE AIR THERMOMETER

Anthony H. Lamb, Hillside, N. J., assignor to Weston Electrical Instrument Corporation, Newark, N. J., a corporation of New Jersey Application March 22, 1948, Serial No. 16,352

2 Claims. (Cl. 73—375)

This invention relates to so-called free air thermometers for use on civilian and other small aircraft for the measurement of the outside or free air temperature.

Electrical systems for the measurement of the free air temperature are customarily employed on commercial and military aircraft, but such systems are relatively expensive and therefore have been installed on comparatively few privately owned planes.

Objects of the invention are to provide simple and inexpensive free air thermometers of bimetallic type for installation on aircraft. An object is to provide a free air thermometer of bimetallic type and a resilient mounting element for supporting the same, either with or without a sunshield, upon the windshield of an airplane. An object is to provide a free air thermometer including a resilient mounting element which may be permanently installed in the glass or plastic windshield of an airplane, the thermometer being inserted into and removed from the mounting element from the cabin side of the windshield without making or breaking clamping connections at the front of the windshield.

These and other objects and the advantages of the invention will be apparent from the following specification when taken with the accompanying drawings in which:

Fig. 1 is a vertical section through an airplane windshield and free air thermometer embodying the invention;

Fig. 2 is a fragmentary front elevation of the mounted thermometer as seen from within the airplane cabin or cockpit;

Fig. 3 is an exploded view, on a larger scale, of the thermometer, mounting element and sunshield before assembly on a windshield; and Fig. 4 is a vertical section through the windshield and mounting, but with the sunshield and thermometer removed.

In the drawings, the reference character W identifies an airplane windshield of glass or plastic material having an opening 1 therethrough, see Fig. 3, in which is seated a resilient mounting member M of natural or artificial rubber which has a central bore 2 for receiving the hollow stem 3 of a bimetallic thermometer T. The bimetallic element 4 is a helical coil anchored within the outer end of the stem 3 and connected to a staff 5 which displaces a pointer 6 angularly with respect to a scale plate 7 within a circular housing 8. As manufactured commercially, the thermometer stem may have a diameter of the order of 1/8 inch and a length of about 3 inches.

The mounting member M has an annular slot 9 which extends rearwardly from the outer end of the member M to terminate beyond the outer wall of a circumferential groove 10 at the rear or inner end of the resilient mounting member. The outer portion of the mounting member M is conical to facilitate its insertion into the opening 1 of the windshield W, and the side walls of the groove 10 are substantially radial to anchor the mounting member M in the opening of windshield W when the mounting member is wetted and pressed into the opening. The axial length and inner diameter of the groove 10 are somewhat less than the thickness of the windshield W and the diameter of the windshield opening 1, whereby the compression of the mounting member M when seated in the opening 1 reduces the original radial width of the inner end of the slot 9 and the original diameter of the axial bore 2. A tubular sunshield S has its inner end seated in the annular slot 9 of the mounting member M, the wall thickness of the tube S being substantially greater than the radial width of the circular slot 9 of the mounting member M, whereby the sunshield tube S is firmly, but resiliently, supported by the mounting member. The sunshield tube S also functions as a windscoop as its outer end is open and it is provided with transverse wall openings 11 adjacent its inner end.

The mounting member M is inserted into opening 1 of the windshield W and the end of sunshield tube S is then inserted into the annular slot 9. The stem 3 of thermometer T is then inserted into the bore 2 of the mounting member M from the inner or cabin side of the member M, and the thermometer T is thus resiliently supported on the windshield W. The deformation of the mounting member M on insertion into opening 1 reduces the diameter of the bore 2 to appreciably less than its original diameter which preferably was somewhat less than the outer diameter of the thermometer stem 3.

The resilient supporting of the thermometer T and sunshield S protects them against damage if inadvertently struck by a mechanic during servicing of the aircraft. The thermometer T may be readily removed and placed in a locked compartment of the aircraft to prevent loss by petty thievery, or the thermometer may be removed during flight for other temperature measurements, for example measurement of the temperature within the cabin or cockpit. The described assembly of a thermometer within a sunshield is presently preferred but it is of course possible to omit the sunshield.

The invention has been described as applied to the measurement on an aircraft of the free air temperature but it is to be understood that the same mounting means may be secured in the wall of a conduit or gas passage to provide a resilient support for a thermometer which projects into the conduit or passage to indicate the temperature of the gas flowing through the conduit.

It is to be understood that the invention is not limited to the particular embodiment herein illustrated and described since various modifications which may occur to those familiar with the art fall within the spirit and scope of the invention as set forth in the following claims.

I claim:

1. The combination with a thermometer having an elongated stem; of means for mounting said thermometer upon a partition wall having an opening therethrough; said mounting means comprising a resilient mounting member having a circumferential groove with walls for engaging the partition wall upon insertion of the mounting member into the partition wall opening, said mounting member having a central bore for receiving the stem of the thermometer and being provided with an annular slot at the outer end thereof; and a shield tube having the inner end thereof seated in said annular slot.

2. The invention as recited in claim 1, wherein the inner diameter of said circumferential groove of the mounting member is greater than the diameter of the opening through said partition wall, and said shield tube is open at its outer end and has a transverse opening through its wall adjacent its inner end.

ANTHONY H. LAMB.

REFERENCES CITED

The following references are of record in the file of this patent:

UNITED STATES PATENTS

| Number | Name | Date |
|---|---|---|
| 1,479,750 | Smith | Jan. 1, 1924 |
| 1,696,810 | Mond | Dec. 25, 1928 |